(12) United States Patent
Iizuka et al.

(10) Patent No.: US 8,383,742 B2
(45) Date of Patent: Feb. 26, 2013

(54) RUBBER COMPOSITION AND THERMOPLASTIC RESIN COMPOSITION AND PRODUCTION METHOD THEREOF

(75) Inventors: Takeshi Iizuka, Tokyo (JP); Hirokazu Kamioka, Tokyo (JP); Takeshi Kida, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 13/170,393

(22) Filed: Jun. 28, 2011

(65) Prior Publication Data

US 2012/0010369 A1    Jan. 12, 2012

(30) Foreign Application Priority Data

Jul. 9, 2010    (JP) ................................. 2010-156668

(51) Int. Cl.
*C08F 2/00*    (2006.01)
*C08F 12/20*    (2006.01)
*C08F 14/18*    (2006.01)
*C08F 114/18*    (2006.01)
*C08F 214/18*    (2006.01)

(52) U.S. Cl. ......... 526/206; 526/242; 525/199; 525/200

(58) Field of Classification Search .................. 526/206, 526/242; 525/199, 200
See application file for complete search history.

(56) References Cited

U.S. PATENT DOCUMENTS

2012/0108753 A1*  5/2012  Takemura et al. ............ 525/199

FOREIGN PATENT DOCUMENTS

| EP | 0 168 020 A2 | 1/1986 |
|---|---|---|
| JP | 2-202947 A | 8/1990 |
| JP | 61-57641 A | 6/1994 |
| JP | 7-503982 T | 4/1995 |
| JP | 8-073608 A | 3/1996 |
| JP | 10-101880 A | 4/1998 |
| JP | 2003-119293 * | 4/2003 |
| JP | 2007-191576 A | 8/2007 |
| WO | WO-93/14155 A1 | 7/1993 |

* cited by examiner

*Primary Examiner* — Nathan M Nutter
(74) *Attorney, Agent, or Firm* — Dickstein Shapiro LLP

(57) ABSTRACT

The present application relates to a rubber composition containing a fluororubber, a radical initiator having a 1-minute half-life temperature of 280° C. or higher, and a crosslinking assistant having a melting point of 200° C. or higher and having two or more double bonds between carbon atoms; and a thermoplastic resin composition containing a fluororesin and the rubber composition.

24 Claims, No Drawings

US 8,383,742 B2

RUBBER COMPOSITION AND THERMOPLASTIC RESIN COMPOSITION AND PRODUCTION METHOD THEREOF

BACKGROUND OF THE INVENTION

1. Field of the Invention

The present invention relates to a rubber composition and a thermoplastic resin composition, and a production method thereof.

The present application claims priority on the basis of Japanese Patent Application No. 2010-156668 filed in Japan on Jul. 9, 2010, the contents of which are incorporated herein by reference.

2. Description of Related Art

A method consisting of dispersing crosslinked rubber in a resin by dynamic crosslinking has been proposed in the past as a method of controlling the hardness (softness) of a resin.

For example, a fluorinated thermoplastic elastomer is disclosed in Japanese Unexamined Patent Application, First Publication No. S61-57641 that has a continuous phase and a dispersed phase, the continuous phase is essentially composed of a crystalline thermoplastic fluorocarbon, and the dispersed phase is composed of a crosslinked fluoroelastomer.

In addition, a method that uses a resin composition containing a polyamide-based resin and a rubber component is disclosed in, for example, Published Japanese Translation No. 117-503982 of PCT International Publication.

In addition, a method of incorporating a fluorinated terpolymer is disclosed in, for example, Japanese Unexamined Patent Application, First Publication No. H10-101880 in order to enhance tensile strength of a thermoplastic resin composition obtained by dynamic crosslinking.

SUMMARY OF THE INVENTION

The present invention employs the constitutions described below.

According to a first aspect of the present invention, a rubber composition contains a fluororubber, a radical initiator having a 1-minute half-life temperature of 280° C. or higher, and a crosslinking assistant having a melting point of 200° C. or higher and having two or more double bonds between carbon atoms.

In the aforementioned rubber composition according to the first aspect, the radical initiator is preferably 2,3-dimethyl-2,3-diphenylbutane or fluorinated pitch.

In addition, in the aforementioned rubber composition according to the first aspect, the crosslinking assistant is preferably N,N'-m-phenylene bismaleimide.

In addition, a second aspect of the present invention is a thermoplastic resin composition containing a fluororesin and the aforementioned rubber composition of the present invention.

In the aforementioned thermoplastic resin composition of the second aspect, the rubber composition in the fluororesin is preferably crosslinked.

In addition, in the aforementioned thermoplastic resin composition of the second aspect, the fluororesin is preferably tetrafluoroethylene-hexafluoropropylene copolymer (FEP), perfluoroalkoxy fluororesin (PFA) or ethylene-tetrafluoroethylene copolymer (ETFE).

In addition, a third aspect of the present invention is a production method of a thermoplastic resin composition comprising mixing a rubber composition containing a fluororubber, a radical initiator having a 1-minute half-life temperature of 280° C. or higher, and a crosslinking assistant having a melting point of 200° C. or higher and having two or more double bonds between carbon atoms, with a fluororesin at a temperature of 280° C. or higher, and crosslinking the rubber composition in the molten fluororesin.

In the aforementioned production method according to the third aspect, the radical initiator is preferably 2,3-dimethyl-2,3-diphenylbutane or fluorinated pitch.

In addition, in the aforementioned production method of the third aspect, the crosslinking assistant is preferably N,N'-m-phenylene bismaleimide.

In addition, in the aforementioned production method of the third aspect, the fluororesin is preferably tetrafluoroethylene-hexafluoropropylene copolymer (FEP), perfluoroalkoxy fluororesin (PFA) or ethylene-tetrafluoroethylene copolymer (ETFE).

DETAILED DESCRIPTION OF THE INVENTION

Rubber Composition

A rubber composition of the present embodiment contains a fluororubber, a radical initiator having a 1-minute half-life temperature of 280° C. or higher, and a crosslinking assistant having a melting point of 200° C. or higher and having two or more double bonds between carbon atoms.

(Fluororubber)

The fluororubber in the present embodiment may be a rubber having a fluorine atom within a molecule thereof, preferable examples of which include fluorine-containing elastic copolymers of vinylidene fluoride and at least one type of another ethylenic unsaturated monomer copolymerizable therewith, such as vinylene fluoride-ethylene tetrafluoride-propylene copolymer, vinylidene fluoride-ethylene tetrafluoride-propylene hexafluoride copolymer or vinylene fluoride-propylene hexafluoride copolymer. In particular, tetrafluoroethylene-propylene copolymers are preferable since they further improve heat resistance and chemical resistance.

The content of fluorine atoms in the fluororubber is preferably within the range of 0.1 to 40% by weight, more preferably within the range of 1 to 40% by weight. If the content of fluorine atoms is equal to or greater than the lower limit value, heat resistance, chemical resistance and slidability (effects produced by fluorine atoms) become favorable, while if the content of fluorine atoms is less than the upper limit value, crosslinking efficiency (crosslinking becomes difficult if the fluororubber is composed entirely of fluorine atoms) becomes favorable.

Specific examples of fluororubber include AFLAS100s (trade name) manufactured by Asahi Glass, Viton (trade name) manufactured by DuPont, and Dai-El manufactured by Daikin Industries.

One type of fluororubber may be used alone or two or more types may be used in combination.

(Radical Initiator)

A radical initiator having a 1-minute half-life temperature of 280° C. or higher is used in the present embodiment. A radical initiator having a 1-minute half-life temperature of 280° C. or higher is resistant to thermal degradation and can be used for dynamic crosslinking at high temperatures in the case of using a resin having a high melting point such as a fluororesin.

A radical initiator in which the upper limit value of the 1-minute half-life temperature is substantially 350° C. or lower is used from the viewpoint of inhibiting deterioration of a fluororubber or fluororesin used in combination therewith.

The "1-minute half-life temperature" of the radical initiator indicates the temperature when the amount of radical generated as a result of decomposition of the radical initiator falls to one-half the original value in 1 minute.

The 1-minute half-life temperature indicates a value determined in the following manner. Namely, a radical initiator solution having a concentration of 0.1 mol/L is prepared by using benzene for the main solvent, and the resulting solution is sealed in a glass tube in which the atmosphere inside has been replaced with nitrogen. The glass tube is then immersed in a constant-temperature bath adjusted to a prescribed temperature to induce thermal decomposition. The 1-minute half-life temperature can then be determined according to a method complying with, for example, a relational expression during decomposition of organic peroxide in dilute solution.

[Relational Expression During Decomposition of Organic Peroxide in Dilute Solution]

In general, since decomposition of organic peroxide in a dilute solution can be approximately treated as a first-order reaction, this decomposition can be represented as indicated below by defining the amount of decomposed peroxide (PO) as x, defining the decomposition rate constant as k, defining time as t, and defining the PO initial concentration as a.

$$dx/dt = k(a-x) \qquad \text{Formula (1)}$$

$$\ln a/(a-x) = kt \qquad \text{Formula (2)}$$

Here, since half-life is the time until the concentration of PO decreases to half the initial concentration, formula (3) is obtained by representing half-life with $t_{1/2}$ and substituting a/2 for x in formula (2).

$$kt_{1/2} = \ln 2 \qquad \text{Formula (3)}$$

Thus, half-life $t_{1/2}$, at a certain constant temperature can be determined by inducing thermal decomposition at that temperature, plotting the relationship between time (t) and ln a/(a-x), determining k from the slope of the resulting straight line, and substituting the value of k into formula (3).

A decomposition temperature that yields an arbitrary half-life can be obtained from a straight line obtained by measuring $t_{1/2}$ for several prescribed temperatures and plotting the relationship between ln $t_{1/2}$, and 1/T (absolute temperature, K). The decomposition temperature for a 1-minute half-life (1-minute half-life temperature) is determined by using this method.

Among radical initiators, 2,3-dimethyl-2,3-diphenylbutane (1-minute half-life temperature: 285° C.) and fluorinated pitch (1-minute half-life temperature: 300° C.) are examples of preferable radical initiators since they further enhance the crosslinking efficiency of fluororubber.

Specific examples of radical initiators that can be used include Nofmer BC (trade name) manufactured by NOF Corp., and fluorinated pitch (trade name) manufactured by Osaka Gas.

One type of radical initiator may be used alone or two or more types may be used in combination.

The content of the radical initiator in the rubber composition is preferably within the range of 0.1 to 10 parts by weight, preferably within the range of 1 to 5 parts by weight by weight based on 100 parts by weight of the fluororubber. If the content of the radical initiator is equal to or greater than the lower limit value, crosslinking efficiency of the fluororubber is further enhanced, while if the content of the radical initiator is less than the upper limit value, decomposition reactions by the radical initiator are inhibited.

(Crosslinking Assistant)

A crosslinking assistant is used in the present embodiment that has a melting point of 200° C. or higher and has two or more double bonds (>C=C<) between carbon atoms.

In the present embodiment, "melting point" refers to a value measured by thermal analysis.

The melting point of the crosslinking assistant in the present embodiment is 200° C. or higher, preferably within the range of 200 to 320° C. If the melting point of the crosslinking assistant is 200° C. or higher, it is resistant to thermal degradation and can be used for dynamic crosslinking at high temperatures in the case of using a resin having a high melting point such as a fluororesin. On the other hand, if the melting point of the crosslinking assistant is 320° C. or lower, the crosslinking reaction can be allowed to proceed more effectively as a result of melting during crosslinking.

The crosslinking assistant preferably has 2 or more double bonds, and more preferably has 2 to 6 double bonds. A crosslinked structure is formed by connecting fluororubber molecules as a result of having 2 or more double bonds. On the other hand, if the crosslinking assistant has 6 or fewer double bonds, crosslinking density is adequately enhanced. In addition, heat resistance properties are also favorable.

Examples of crosslinking assistants include N,N'-m-phenylene bismaleimide (melting point: 202° C.), 2,2-bis(4-maleimidophenyl)hexafluoromethane and 2-trifluoromethyl-4-maleimidophenyl biphenyl.

In particular, N,N'-m-phenylene bismaleimide is preferable as a crosslinking agent since it greatly enhances crosslinking density of fluororubber.

Specific examples of crosslinking assistants that can be used include Actor PBM (trade name) manufactured by Kawaguchi Chemical Industry.

One type of crosslinking assistant may be used alone or two or more types may be used in combination.

The content of crosslinking assistant in the rubber composition is preferably within the range of 3 to 30 parts by weight, more preferably within the range of 5 to 20 parts by weight by weight based on 100 parts by weight of fluororubber. If the content of crosslinking agent is equal to greater than the lower limit value, crosslinking density of the fluororubber is enhanced, while if the content of crosslinking agent is equal to or less than the upper limit value, softness properties can be maintained.

(Other Components)

The rubber composition of the present embodiment may also contain other components in addition to the aforementioned fluororubber, radical initiator and crosslinking assistant.

Examples of other components include metal powder, inorganic powder, inorganic oxides, inorganic compounds, antioxidants, colorants and anti-photodegradation agents.

Crosslinking of a rubber composition containing fluororubber can be favorably carried out even at high temperatures (temperatures equal to or higher than the melting point of fluororesin such as roughly 280° C. or higher), which was previously difficult, by using the previously described combination of fluororubber, specific radical initiator resistant to thermal degradation and crosslinking assistant in the rubber composition of the present embodiment.

The resulting crosslinked fluororubber has high crosslinking density, favorable tensile strength and softness, and superior heat resistance.

The crosslinked fluororubber is introduced into a resin such as a fluororesin in a uniformly dispersed state by carrying out dynamic crosslinking using this rubber composition.

As a result, hardness can be controlled even in the case of a fluororesin and the like having a high melting point.

<Thermoplastic Resin Composition>

The thermoplastic resin composition of the present embodiment contains a fluororesin and the previously described rubber composition of the present invention.

(Fluororesin)

The fluororesin in the present embodiment is a resin that has a fluorine atom in a molecule thereof, and preferable examples include tetrafluoroethylene-hexafluoropropylene copolymer (FEP), perfluoroalkoxy fluororesin (PFA) and ethylene-tetrafluoroethylene copolymer (ETFE) since these fluororesins enable a high degree of softness to be easily obtained.

Specific examples of fluororesins that can be used include 130J (trade name) manufactured by DuPont-Mitsui, P-63PT (trade name) manufactured by Asahi Glass, and C-88AP (trade name) manufactured by Asahi Glass.

The mixing ratio of fluororesin and the aforementioned rubber composition in the thermoplastic resin composition in terms of the weight ratio of fluororubber in the rubber composition to the fluororesin is preferably within the range 0.5/99.5 to 50/50, more preferably within the range of 10/90 to 40/60. Softness increases if the weight ratio is equal to or greater than the lower limit value thereof (if the ratio of the content of fluororubber increases). On the other hand, hardness increases if the weight ratio is equal to or less than the upper limit value thereof (if the ratio of the content of fluororubber decreases).

(Other Components)

The thermoplastic resin composition of the present embodiment may contain other components in addition to the aforementioned fluororesin and rubber composition.

Examples of other components include metal powder, inorganic powder, inorganic oxides, inorganic compounds, antioxidants, colorants and anti-photodegradation agents.

In the thermoplastic resin composition of the present embodiment, the rubber composition is preferably crosslinked in the fluororesin since in addition to demonstrating superior heat resistance and oil resistance, a higher degree of softness is obtained or hardness is easily controlled.

There are no particular limitations on the method used to produce the thermoplastic resin composition of the present invention, and a preferable example thereof is the "Thermoplastic Resin Composition Production Method" subsequently described as an example since it enables a thermoplastic resin composition in which the rubber composition is crosslinked in the fluororesin to be easily prepared.

<Thermoplastic Resin Composition Production Method>

The production method of the thermoplastic resin composition of the present embodiment consists of mixing a rubber composition containing a fluororubber, a radical initiator having a 1-minute half-life temperature of 280° C. or higher and a crosslinking assistant having a melting point of 200° C. or higher and two or more double bonds between carbon atoms, with a fluororesin at a temperature of 280° C. or higher, and crosslinking the rubber composition in the molten fluororesin.

Examples of the fluororubber, radical initiator, crosslinking assistant and fluororesin used in the production method of the present invention respectively include the same fluororubber, radical initiator, crosslinking agent and fluororesin as previously described.

In particular, the radical initiator is preferably 2,3-dimethyl-2,3-diphenylmethane or fluorinate pitch, the crosslinking assistant is preferably N,N'-m-phenylene bismaleimide, and the fluororesin is preferably tetrafluoroethylene-hexafluoropropylene copolymer (FEP), perfluoroalkoxy fluororesin (PFA) or ethylene-tetrafluoroethylene copolymer (ETFE).

Temperature conditions when mixing the fluororesin and the rubber composition are such that the temperature during mixing is at least 280° C., preferably 300° C. or higher, more preferably within the range of 300 to 350° C. If the temperature during mixing is 280° C. or higher, dynamic crosslinking can be carried out in the molten fluororesin. If the temperature during mixing is equal to or lower than the upper limit temperature, thermal degradation of components contained in the rubber composition is inhibited.

The duration of mixing of the fluororesin and the rubber composition is preferably 5 minutes or longer, more preferably within the range of 5 to 10 minutes. If the mixing time is within the aforementioned ranges, the fluororesin and the rubber composition can be adequately melted and kneaded. The duration of mixing can be varied according to the aforementioned temperature conditions during mixing. In addition, in the case of not carrying out melting and kneading for 5 minutes or longer, the total heating time preferably exceeds 5 minutes under the same temperature conditions as the temperature during melting and kneading.

There are no particular limitations on the method used to mix the fluororesin and the rubber composition, and a conventionally known mixing method can be used.

In the production method of the present embodiment, as a result of mixing the fluororesin and the rubber composition at a temperature of 280° C. or higher, in addition to melting the fluororesin, the radical initiator generates radicals during thermal decomposition, and carbon atoms of the crosslinking assistant at allylic positions are radicalized. Next, the radicals generated as a result of radicalization radicalize carbon atoms of hydrocarbon moieties of the fluororubber, thereby allowing the crosslinking reaction to proceed. As a result of this crosslinking reaction within the molten fluororesin, a crosslinked fluororubber having superior heat resistance is formed from the rubber composition, and a fluororesin is produced in which the crosslinked fluororubber is uniformly dispersed in the fluororesin.

The thermoplastic resin composition of the present embodiment obtained according to the production method of the present embodiment is a novel material that has superior heat resistance and oil resistance in addition to softness.

EXAMPLES

Although the following provides a more detailed explanation of the present invention using examples thereof, the present invention is not limited to these examples.

Components used in the examples are indicated below.

(Fluororubber)

Trade name: AFLAS100s, Asahi Glass, specific gravity: 1.55, fluorine atom content: 57% by weight (Radical Initiators)

2,3-dimethyl-2,3-diphenylmethane, trade name: Nofmer BC, NOF Corp., molecular weight: 238.38, 1-minute half-life temperature: 285° C.

Fluorinated hydrocarbon, trade name: Fluorinated Pitch, Osaka Gas, 1-minute half-life temperature: 300° C.

(Comparative Radical Initiator Component)

2,5-dimethyl-2,5-di(t-butylperoxy)hexane, trade name: Perhexyne 25B, NOF Corp., molecular weight: 290.45, 1-minute half-life temperature: 194.3° C.

(Crosslinking Assistants)

N,N'-m-phenylene bismaleimide, trade name: Actor PBM, Kawaguchi Chemical Industry, molecular weight: 268, melting point: 202° C.

2-trifluoromethyl-4-maleimidophenyl biphenyl, synthesized in-house, molecular weight: 420

Synthesis method: 2,2-bis(trifluoromethyl)benzidine was dissolved in tetrahydrofuran followed by the addition of maleic anhydride and allowing to react for 30 minutes while heating at 60° C. Subsequently, pyridine and acetic anhydride were added followed by additionally reacting for 1 hour. The solvent was removed from the resulting reaction solution with an evaporator and the resulting solid was recrystallized with acetic anhydride to obtain a pure product of 2-trifluoromethyl-4-maleimidophenyl biphenyl.

(Comparative Crosslinking Assistant Component)

Triallylisocyanurate, trade name: TAIC M-60, Nippon Kasei Chemical, melting point: 23 to 27° C.

(Fluororesins)

FEP, trade name: 130J, DuPont-Mitsui, specific gravity: 2.16, MFR: 0.8 to 35 g/10 min., tensile strength: 20 MPa, melting point: 270° C.

PFA, trade name: P-63PT, Asahi Glass, specific gravity: 2.12, MFR: 7 to 18 g/10 min., tensile strength: 30 MPa, melting point: 310° C.

ETFE, trade name: C-88AP, Asahi Glass, specific gravity: 1.74, MFR: 4.5 to 6.7 g/10 min., tensile strength: 48 MPa, melting point: 260° C.

<Production of Crosslinked Fluororubber>

Each component was mixed under the kneading conditions indicated below using a batch kneader (twin screw extruder) in accordance with the compositions shown in Table 1, followed by molding under the hot pressing conditions indicated below to produce a crosslinked fluororubber sheet.

Kneading conditions: screw rotating speed: 50 rpm, kneader temperature: 150° C., kneading time: 5 minutes Hot pressing conditions: pressure: 25 MPa, temperature: 300° C., pressing time: 5 minutes <Production of Thermoplastic Resin Composition>

Fluororubber, radical initiator and crosslinking assistant were mixed in accordance with the compositions shown in Table 2 to prepare a rubber composition, followed by mixing the rubber composition with fluororesin under the following kneading conditions using a batch kneader (twin screw extruder), crosslinking the fluororubber in the molten fluororesin under the hot pressing conditions indicated below and extruding to produce a crosslinked sheet of a thermoplastic resin composition.

Kneading conditions: screw rotating speed: 50 rpm, kneader temperature in case of using FEP and EFTE and fluororesins: 280° C., kneader temperature in the case of using PFA: 320° C., kneading time: 5 minutes Hot pressing conditions: pressure: 25 MPa, temperature in case of using FEP and ETFE as fluororesins: 300° C., temperature in case of using PFA: 320° C., pressing time: 5 minutes <Evaluation>

The crosslinking density of the resulting crosslinked fluororubber sheets was measured.

In addition, measurement of tensile strength and elongation as well as evaluation of heat resistance were carried out for the resulting crosslinked sheets and crosslinked thermoplastic resin composition sheets. The results are shown in Tables 1 and 2.

The methods used to measured crosslinking density, tensile strength and elongation and the method used to evaluate heat resistance are indicated below.

[Crosslinking Density]

1 g of a crosslinked fluororubber sheet were immersed in 10 mL of a good solvent followed by continuing to shake and stir for 24 hours. After 24 hours had elapsed, the weight of the crosslinked sheet was measured and crosslinking density (wt %) was determined by measuring the change in weight before and after immersion.

[Tensile Strength and Elongation]

Tensile strength and elongation were respectively measured in compliance with the procedure for measuring tensile strength of rubber of JIS K6251.

[Heat Resistance]

The resulting crosslinked fluororubber sheets and crosslinked thermoplastic resin composition sheets were respectively stored in air for 500 hours at 275° C. followed by measurement of tensile strength in the same manner as described above.

The percentage of change in tensile strength before and after storage was then determined, and heat resistance was evaluated based on the criteria indicated below.

Percentage of change in tensile strength (%)=Tensile strength after storage/tensile strength before storage×100

○: Percentage of change in tensile strength of 70% or more

X: Percentage of change in tensile strength of less than 70%

TABLE 1

| | | Ex. 1 | Ex. 2 | Ex. 3 | Ex. 4 | Comp. Ex. 1 | Comp. Ex. 2 | Comp. Ex. 3 | Comp. Ex. 4 | Comp. Ex. 5 |
|---|---|---|---|---|---|---|---|---|---|---|
| Fluororubber | AFLAS 100s | 100 | 100 | 100 | 100 | 100 | 100 | 100 | 100 | 100 |
| Radical initiator | Nofmer BC | 3 | 3 | | | 3 | | | 3 | |
| | Fluorinated pitch | | | 3 | 3 | | | | | |
| | Perhexyne 25B | | | | | | 3 | 3 | | |
| Crosslinking assistant | Actor PBM | 5 | 10 | 10 | | | 5 | | | 5 |
| | 2-trifluoromethyl-4-maleimidophenyl biphenyl | | | | 5 | | | | | |
| | TAIC M-60 | | | | | 5 | | 5 | | |
| Crosslinking density (wt %) | | 65 | 71 | 73 | 60 | 30 | 22 | 18 | 0 | 0 |
| Tensile strength (MPa) | | 7.8 | 9.5 | 10.6 | 6.7 | 5.8 | 5.1 | 5.4 | 4.5 | 5.3 |
| Elongation (%) | | 1000< | 1000< | 1000< | 1000< | 700 | 700 | 400 | 300 | 500 |
| Heat resistance | | ○ | ○ | ○ | ○ | X | X | X | X | X |

Based on the results of Table 1, the crosslinked fluororubber sheets of Examples 1 to 4 demonstrated higher crosslinking density and favorable tensile strength and elongation (softness) in comparison with the comparative examples, and were also determined to have superior heat resistance.

TABLE 2

| | | Ex. 5 | Ex. 6 | Ex. 7 | Ex. 8 | Ex. 9 | Comp. Ex. 6 | Comp. Ex. 7 | Comp. Ex. 8 | Comp. Ex. 9 |
|---|---|---|---|---|---|---|---|---|---|---|
| Fluororesin | FEP 130J | 70 | | | 70 | | 70 | 70 | 70 | |
| | PFA P-63PT | | 70 | | | | | | | |
| | ETFE C-88AP | | | 70 | | 70 | | | | 70 |
| Fluororubber | AFLAS 100s | 30 | 30 | 30 | 30 | 30 | 30 | 30 | 30 | |
| Radical initiator | Nofmer BC | 0.9 | 0.9 | 0.9 | | | 0.9 | | | |
| | Fluorinated pitch | | | | 0.9 | 0.9 | | | | |
| | Perhexyne 25B | | | | | | | | 0.9 | 0.9 |
| Crosslinking assistant | Actor PBM | 1.5 | 1.5 | 1.5 | 1.5 | | | 1.5 | | |
| | 2-trifluoromethyl-4-maleimidophenyl biphenyl | | | | | 1.5 | | | | |
| | TAIC M-60 | | | | | | 1.5 | | 1.5 | |
| Tensile strength (MPa) | | 10.2 | 8.6 | 13.5 | 11.3 | 12.1 | 10.5 | 8.2 | 12.6 | 48 |
| Elongation (%) | | 300 | 350 | 250 | 250 | 250 | 300 | 300 | 200 | 400 |
| Heat resistance | | ○ | ○ | ○ | ○ | ○ | X | X | X | X |

Based on the results of Table 2, the crosslinked thermoplastic resin composition sheets of Examples 5 to 9 were determined to have softness as well as demonstrate superior heat resistance in comparison with the comparative examples.

In addition, based on a comparison of Example 5 and Example 8, in the case of using FEP as fluororesin, hardness of the fluororesin was determined to be able to be controlled by changing the composition of the rubber composition.

Moreover, the crosslinked thermoplastic resin composition sheets of Examples 5 to 9 can be said to also demonstrate superior oil resistance as a result of using fluororesin and fluororubber.

According to the rubber composition of the present invention, the hardness of fluororesins having a high melting point can be controlled. In addition, according to the present invention, a thermoplastic resin composition having superior heat resistance and oil resistance together with softness can be provided along with a production method thereof.

Although the above has provided an explanation of preferable examples of the present invention, the present invention is not limited to these examples. Additions, omissions, substitutions and other changes can be made to the composition of the present invention within a range that does not deviate from the purport thereof.

What is claimed is:

1. A rubber composition, comprising:
   a fluororubber,
   a radical initiator having a 1-minute half-life temperature of 280° C. or higher, and
   a crosslinking assistant having a melting point of 200° C. or higher and having two or more double bonds between carbon atoms.

2. The rubber composition according to claim 1, wherein the radical initiator is 2,3-dimethyl-2,3-diphenylbutane or fluorinated pitch.

3. The rubber composition according to claim 1, wherein the crosslinking assistant is N,N'-m-phenylene bismaleimide.

4. The rubber composition according to claim 2, wherein the crosslinking assistant is N,N'-m-phenylene bismaleimide.

5. A thermoplastic resin composition, comprising:
   a fluororesin, and
   the rubber composition according to claim 1.

6. A thermoplastic resin composition, comprising:
   a fluororesin, and
   the rubber composition according to claim 2.

7. A thermoplastic resin composition, comprising:
   a fluororesin, and
   the rubber composition according to claim 3.

8. A thermoplastic resin composition, comprising:
   a fluororesin, and
   the rubber composition according to claim 4.

9. The thermoplastic resin composition according to claim 5, wherein the rubber composition in the fluororesin is crosslinked.

10. The thermoplastic resin composition according to claim 6, wherein the rubber composition in the fluororesin is crosslinked.

11. The thermoplastic resin composition according to claim 7, wherein the rubber composition in the fluororesin is crosslinked.

12. The thermoplastic resin composition according to claim 8, wherein the rubber composition in the fluororesin is crosslinked.

13. The thermoplastic resin composition according to claim 5, wherein the fluororesin is tetrafluoroethylene-hexafluoropropylene copolymer (FEP), perfluoroalkoxy fluororesin (PFA) or ethylene-tetrafluoroethylene copolymer (ETFE).

14. The thermoplastic resin composition according to claim 6, wherein the fluororesin is tetrafluoroethylene-hexafluoropropylene copolymer (FEP), perfluoroalkoxy fluororesin (PFA) or ethylene-tetrafluoroethylene copolymer (ETFE).

15. The thermoplastic resin composition according to claim 7, wherein the fluororesin is tetrafluoroethylene-hexafluoropropylene copolymer (FEP), perfluoroalkoxy fluororesin (PFA) or ethylene-tetrafluoroethylene copolymer (ETFE).

16. The thermoplastic resin composition according to claim 8, wherein the fluororesin is tetrafluoroethylene-hexafluoropropylene copolymer (FEP), perfluoroalkoxy fluororesin (PFA) or ethylene-tetrafluoroethylene copolymer (ETFE).

17. A production method of a thermoplastic resin composition, comprising:
   mixing a rubber composition containing a fluororubber, a radical initiator having a 1-minute half-life temperature of 280° C. or higher, and a crosslinking assistant having a melting point of 200° C. or higher and having two or more double bonds between carbon atoms, with a fluororesin at a temperature of 280° C. or higher, and
   crosslinking the rubber composition in the molten fluororesin.

18. The production method of a thermoplastic resin composition according to claim 17, wherein the radical initiator is 2,3-dimethyl-2,3-diphenylbutane or fluorinated pitch.

19. The production method of a thermoplastic resin composition according to claim 17, wherein the crosslinking assistant is N,N'-m-phenylene bismaleimide.

20. The production method of a thermoplastic resin composition according to claim 18, wherein the crosslinking assistant is N,N'-m-phenylene bismaleimide.

21. The production method of a thermoplastic resin composition according to claim 17, wherein the fluororesin is tetrafluoroethylene-hexafluoropropylene copolymer (FEP), perfluoroalkoxy fluororesin (PFA) or ethylene-tetrafluoroethylene copolymer (ETFE).

22. The production method of a thermoplastic resin composition according to claim 18, wherein the fluororesin is tetrafluoroethylene-hexafluoropropylene copolymer (FEP), perfluoroalkoxy fluororesin (PFA) or ethylene-tetrafluoroethylene copolymer (ETFE).

23. The production method of a thermoplastic resin composition according to claim 19, wherein the fluororesin is tetrafluoroethylene-hexafluoropropylene copolymer (FEP), perfluoroalkoxy fluororesin (PFA) or ethylene-tetrafluoroethylene copolymer (ETFE).

24. The production method of a thermoplastic resin composition according to claim 20, wherein the fluororesin is tetrafluoroethylene-hexafluoropropylene copolymer (FEP), perfluoroalkoxy fluororesin(PFA) or ethylene-tetrafluoroethylene copolymer (ETFE).

* * * * *